United States Patent Office 2,759,910
Patented Aug. 21, 1956

2,759,910
POLYMERISED COMPOSITIONS

John Noel Milne, Epsom Downs, and Robert George Denton Crick, West Ewell, England, assignors to The Distillers Company Limited, Edinburgh, Scotland, a British company No Drawing. Application October 20, 1952,
Serial No. 315,812

Claims priority, application Great Britain
November 6, 1951

12 Claims. (Cl. 260—80.5)

The present invention relates to new polymeric material derived from polymers containing free carboxyl and nitrile groups. It refers in particular to the production of polymeric material with new and improved properties derived from polymers containing free carboxyl and nitrile groups.

The copolymerisation of arcylonitrile and acrylic acid is known. It has been suggested that the copolymerisation should be carried out in the temperature range 20–50° C. in aqueous solution saturated with the various monomers employed. The resulting products are said to be useful for the production of films, foils and fibres. It has also been suggested that a mixture of acrylic acid, an acrylic ester and/or acrylic nitrile may be polymerised together with styrene to form useful products which are soluble in aqueous alkaline solution and may be used in the preparation of threads, films and coatings.

We have found that a wide variety of polymers which contain free carboxyl and nitrile groups may be prepared by the interpolymerisation of an alpha-beta ethylenically unsaturated carboxylic acid with an alpha-beta ethylenically unsaturated nitrile with the addition of a third copolymerisable compound.

The interpolymerisation may be effected by the action of heat, ultraviolet light, polymerisation catalysts such as an organic peroxide or other initiators and may take place in the homogeneous phase or in aqueous dispersion. It is preferred that the polymerisation be carried out in the homogeneous phase by subjecting to polymerisation conditions a mixture of the monomeric compounds to be employed. If desired, the monomeric compounds may be dissolved in an inert solvent and the resulting solution subjected to polymerisation conditions. The interpolymerisation may be brought about by subjecting an aqueous emulsion or dispersion of the monomeric compounds to polymerisation conditions, but as stated above, this is not the preferred method because we have found that the polymers produced by this technique are frequently not so readily cross-linked according to the process of the present invention as hereinafter described, as those produced by homogeneous phase polymerisation, because one of the reacting monomers may be preferentially soluble in the aqueous medium with the result that its concentration in the final copolymer is reduced.

It is preferred to carry out the polymerisation in the substantial absence of molecular oxygen gas and this may be most suitably done by carrying out the polymerisation in an inert atmosphere such as nitrogen gas. In this way retardation of the polymerisation reaction and discolouration of the resultant polymer due to oxidation may be avoided.

By "alpha-beta ethylenically unsaturated carboxylic acid" we mean a monomeric compound which contains the group

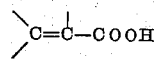

Examples of such compounds are acrylic acid and its homologues such as alpha-methyl acrylic crotonic, angelic and tiglic acids and its phenyl derivatives such as cinnamic and atropic acids and its halogen derivatives such as alpha-chlor-acrylic acid. We also include dibasic alpha-beta unsaturated acids such as maleic, fumaric, mesaconic and citraconic acids.

By alpha-beta unsaturated nitrile compounds we mean all those compounds listed above as suitable alpha-beta unsaturated carboxylic acids in which the carboxyl group or groups have been replaced by nitrile groups.

As examples of a "third copolymerisable compound" we may mention vinyl hydrocarbons such as butadiene, styrene, alpha methyl styrene and their lower alkyl nuclear homologues, vinyl esters, vinyl ethers, vinyl ketones, N-vinyl compounds and polymerisable allyl compounds. Suitable examples of vinyl organic esters include the formate, acetate, propionate, butyrate, stearate and benzoate, suitable vinyl ethers include methyl, ethyl, isopropyl, butyl, phenyl, tolyl, napthyl, vinyl and propenyl ethers, while suitable vinyl ketones includes the methyl, ethyl isopropyl and butyl ketones. By "N-vinyl compounds" is meant compounds having a nitrogen atom to which is attached a vinyl group, suitable examples including N-vinyl urethanes, N-vinyl carbazole, N-vinyl pyrrole, N-vinyl piperidine and N-vinyl pyrrolidone. By "polymerisable allyl compounds" is meant those polymerisable compounds having an allyl group in the molecule such as esters of allyl alcohol with aliphatic and aromatic carboxylic acids, allyl ethers and allyl substituted aldehydes and ketones and their acetals and ketals. Other suitable polymerisable compounds include the esters of substituted allyl alcohols such as alpha-methallyl, alpha-ethallyl, alpha-chlorallyl, crotonyl and cinnamyl alcohols and but-1-ene-3-ol and pent-1-ene-3-ol with acids such as formic, acetic, lactic, butyric and glycollic, salicylic, oleic, benzoic and phthalic.

These copolymers of alpha-beta unsaturated carboxylic acids with alpha-beta unsaturated nitriles and the ternary copolymers formed when a third copolymerisable compound is added to the monomeric mixture have a complete range of properties depending on which monomer units are chosen and upon their relative proportions. But it is generally found that these polymers are devoid of the physical properties of a thermoset resin and have low softening points. Further, it is found that they are often readily attacked and dissolved by a wide variety of organic solvents such as acetone, benzene, dioxan, dimethylformamide, ethyl acetate, methylene chloride and tetra hydrofuran.

The object of the present invention is to provide polymerised compositions, derived from the aforementioned polymers which contain free carboxyl and nitrile groups, which have improved mechanical properties and/or are more resistant to attack by organic solvents.

It has now been discovered that this object may be attained by treating the polymers containing free carboxyl and nitrile groups in such a way that cross-linking is obtained between the carboxyl and nitrile groups.

It is known that organic acids may be made to react with organic nitriles according to the following equation:

$$R_1CN + R_2COOH = R_1-CO-NH-CO-R_2$$

(See Wiley & Guerrant J. A. C. S. 71, 981–2, 1949). From a study of the reaction conditions of known examples of this reaction it appears that it does not take place readily and it has been necessary to use high temperatures and pressures to bring about the formation of the grouping —CO—NH—CO, hereinafter termed the diacylamino group, from the inter-action of carboxylic acids and nitriles.

We have made the surprising discovery that when the carboxyl group and the nitrile group are attached to the same polymer chain the interaction of these groups, with the consequent formation of intramolecular and intermolecular diacylamino groups may be brought about by the action of heat alone or of heat and pressure on the polymer under conditions which do not destroy the said polymer. The cross-linking afforded in this way by the formation of the diacylamino groups improves the general mechanical properties of said polymer and/or its resistance to solvent attack thus achieving the aforementioned objects.

Accordingly, the present invention provides a process for the production of new and improved polymerised compositions which comprises heating a polymer containing free carboxyl and nitrile groups attached to the same polymer chain to at least 80° C. with or without the application of pressure whereby cross-linking by the formation of diacylamino groupings occurs.

To obtain marked improvements in the nature of the polymer containing the free carboxyl and nitrile groups, it is essential that it should contain a sufficient number of such groups and it is therefore, preferred that the polymers to which the process of the present invention is applied should contain at least 10 mols. per cent of alpha-beta unsaturated carboxylic acid and alpha-beta unsaturated nitrile compound units. It is further preferred that the ratio of the number of free carboxyl groups to free nitrile groups should be in the range of 0.1 to 10 and for polymers containing a low proportion of alpha-beta unsaturated carboxylic acid and alpha-beta unsaturated nitrile compound units in their molecular structure the most advantageous results are obtained if they contain substantially equal numbers of free carboxyl and nitrile groups.

The process of the present invention may be carried out in various ways. For instance, the polymers containing the free carboxyl and nitrile groups may be pressed in a heated positive moulding machine for a time dependent on the temperature and, to a lesser degree, the pressure of working of the machine until the cross-linking has occurred. Generally it is preferred to operate at a temperature in the range 150–200° C. for a reaction period of between 5 and 30 minutes. The pressure of operation is not critical for the process of the present invention so long as it is sufficient to cause the polymers being treated to flow at the temperature of operation of the machine. Pressures in the range 500 to 7000 lbs. per square inch may suitably be employed. It may be advantageous to mix the polymers with a suitable plasticizer so that the handling and working of the composition may be made more easy. It is essential, of course, that the plasticizer used should not inhibit the interaction of the carboxyl and nitrile groups and it is preferred that, in fact, the plasticizer used should catalyze the reaction as hereinafter described.

It is possible to bring about the cross-linking according to the present invention by the action of heat alone on the polymers containing the free carboxyl and nitrile groups. In this embodiment of the present invention it is necessary to heat the polymer to and maintain it at a high temperature for a prolonged period. We have found that the temperature must be at least 80° C. and preferably in the range 100 to 200° C., although any temperature up to the decomposition point of the polymer may be employed. The reaction period may vary from a few minutes up to periods of more than 60 minutes depending on the form of the polymer when subjected to heat and the degree of cross-linking desired. For instance when the polymer containing the free carboxyl and nitrile groups contains a high proportion of such groups and is in the form of a fibre, the cross-linking according to the process of the present invention may be brought about by running the fibre through a heated zone in which the period for which the fibre is heated is only a few minutes. It will of course be appreciated that the time necessary to achieve a substantial change in the physical properties of the polymer to be treated by the cross-linking reaction of the present invention will vary greatly with its constitution and consequently those polymers with low proportions of carboxyl and/or nitrile groups will require high reaction temperatures or long reaction times, or both, whereas those polymers with high proportions of carboxyl and/or nitrile groups will only require the milder reaction conditions.

We have further found that the reaction of free carboxyl groups with free nitrile groups attached to the same polymer chain may be catalysed by acidic catalysts. For instance, acidic inorganic compounds such as ammonium chloride and ammonium phosphate, Friedel-Crafts type catalysts such as aluminum chloride and zinc chloride and weakly acidic organic compounds such as the monoesters of phthalic acid, and strongly acidic compounds such as p-toluene sulphonic acid, beta-camphoryl-sulphonic acid, trichloracetic acid and phosphoric acid may be used. As mentioned above many of these catalysts, such as, for instance, cetostearyl hydrogen phthalate, have some plasticising action upon the polymer to be treated according to the process of the present invention and, therefore, their use may be advantageous.

According to a modification of the present invention the new and improved polymerised compositions may be obtained directly by carrying out the polymerisation of the alpha-beta unsaturated carboxylic acid and the alpha-beta unsaturated nitrile with the addition of a third copolymerisible compound under such conditions that the polymer chains containing the free carboxyl and nitrile groups which are initially formed react further and become cross-linked due to the formation of diacylamino groupings.

Previously the inter-polymerisation of unsaturated acids and nitriles of the type described above has been carried out at temperatures below 100° C. and usually below 50° C. The low temperatures have been preferred because it has been found generally in the art of polymerisation that as the temperature of polymerisation is increased the molecular size of the resulting polymer is reduced with the consequent increase in its vulnerability to solvent attack and deterioration in its mechanical properties.

We have found, however, that if the inter-polymerisation of an alpha-beta unsaturated carboxylic acid with an alpha-beta unsaturated nitrile with or without the addition of a third copolymerisable compound be carried out under special conditions, notably at temperatures above 100° C., it results in new and improved polymerised compositions in which cross-linking has occurred due to the formation of diacylamino groupings. The polymers formed in this way have improved resistance to solvents and improved mechanical properties over the corresponding polymers formed by polymerisation of the same monomers under conditions heretofore employed, i. e. at temperatures below 100° C. It will be appreciated that the optimum conditions whereby the improved products of the present invention are produced will vary with the nature and relative concentration of the monomers employed. For instance, we have found that where the concentration of the third copolymerisable compound is above 60 mols. per cent of the whole reaction mixture, the polymerisation is best carried out at temperatures well above 100° C., i. e. at temperatures up to 200° C. On the other hand, when the concentration of the third copolymerisable compound is reduced below 60 mols. per cent, i. e. the concentration of the unsaturated carboxylic acid and nitrile is increased, it may be possible to produce the improved products of the present invention by carrying out the polymerisation at lower temperatures, i. e. temperatures near 100° C.

Another factor, which may be varied to bring about the special conditions necessary for the production of the improved polymerised compositions according to the modification of the present invention, is the duration of the polymerisation period. For instance, the temperature of the polymerisation process may be decreased if the time allowed for the polymerisation is increased.

As has been mentioned before, the reaction of carboxyl groups with nitrile groups is catalysed by the addition of any of the aforementioned catalysts and accordingly any of them may be added to the monomeric mixture which is to be polymerised according to the modification of the present invention provided that the catalyst chosen is compatible with the monomer mixture and does not inhibit the polymerisation thereof.

The polymerised compositions produced according to the above modification of the present invention may still contain some free carboxyl and nitrile groups which have not been converted into diacylamino groupings and, of course, these polymers may be further cross-linked according to any of the processes hereinbefore described.

The polymerised compositions of the present invention may be compounded or mixed with compounds such as pigments, dyes, fillers, stabilisers and the like, if so desired either before or after the cross linking reaction. It is however, essential that the added compounds should not inhibit the formation of the diacylamino groups according to the process of the present invention if the addition of these compounds is to be made before the cross-linking reaction is carried out.

One advantage of the process of the present invention is that no water or other volatile low molecular weight product is evolved during the cross-linking and consequently the produced polymerised compositions have good mechanical and electrical properties and find a wide variety of uses.

For instance not only can they be used for the production of moulded articles with improved physical characteristics, but also some of the cross-linked polymerised compositions of the present invention may be used as lacquers or adhesives. For this use of the polymerised compositions of the present invention it is often most advantageous to apply the polymer containing the free carboxyl and nitrile groups to the surfaces to be lacquered or glued and then carry out the cross-linking reaction on the thin film of polymer thus obtained.

The following examples are given to illustrate the production of various polymers containing free carboxyl and nitrile groups attached to the same polymer chain and their subsequent improvement according to the process of the present invention. Examples 4 and 5 illustrate the modification of the present invention wherein the production and the cross-linking of the polymers are carried out at one and the same time. The parts referred to are by weight.

*Example 1*

A ternary copolymer was obtained by the single phase polymerisation of a mixture of 87.5 parts of styrene, 7.2 parts of acrylic acid and 5.3 parts of acrylonitrile at 80° C. for 192 hours in an atmosphere of nitrogen. The resulting polymer was dissolved in a 1:1 benzene/dioxan mixture, precipitated from solution and washed with ethanol to give polymer A.

To a 10 gram sample of polymer A was added 0.02 gram of cetostearyl hydrogen phthalate in 20 mls. of ethanol. This hydrogen phthalate ester was made by the partial esterification of phthalic acid with an approximately equimolecular commercial mixture of cetyl and stearyl alcohols. After mixing the solvent was removed and the resultant polymer was pressed in a 2" diameter circular positive mould for 15 minutes at 180° C. at 4000 lbs./in.$^2$ to form a disc of cross-linked polymer containing diacylamino groupings (sample B).

Another cross-linked sample disc was prepared by treating a 10 gram sample of polymer A with a solution of 0.02 gram of ammonium chloride in 20 mls. of dilute aqueous dioxan. The solvent was removed and the polymer pressed as before to give sample C.

The relative resistance to attack by ethyl acetate of these three samples was then determined by adding 100 mls. of ethyl acetate to 10 gram samples. Sample A dissolved readily to give a clear solution, while sample B was swollen, and finally disintegrated to form a stringy gel. Sample C was swollen to an opaque gel which retained the shape of the unswollen specimen.

*Example 2*

A ternary copolymer was prepared from styrene, acrylic acid and acrylonitrile in the molar ratios of 10:1:1 by single phase polymerisation under nitrogen for 210 hours at 80° C. The copolymer dissolved readily in dioxan to give a viscous 10% w./v. solution which showed no signs of gelation.

A sample of the copolymer was pressed as in Example 1 in a 2" circular positive mould to form a disc of cross-linked polymer which would not dissolve in dioxan (10% w./v.) but gave a very stiff opalescent gel.

*Example 3*

A further ternary copolymer was prepared by emulsion polymerisation under nitrogen of 100 parts of styrene, acrylic acid and acrylonitrile in the same molar ratio as in Example 2 emulsified in 200 parts of 2% w./v. aqueous sodium lauryl sulphate solution containing 0.1 part of isopropyl benzene hydroperoxide. The polymerisation was carried out for 40.5 hours at 50° C. to give 84.7 parts of polymer. This polymer with benzene gave a 10% w./v. solution with no sign of gelation.

10 parts of the polymer was intimately mixed with 0.02 part of p-toluene sulphonic acid and the resulting mixture pressed under the same conditions as in Examples 1 and 2, to give a moulding which with 88 parts of benzene (10% w./v.) gave a viscous opalescent gelatinous solution.

*Example 4*

A mixture of styrene, acrylic acid and acrylonitrile in the same proportions as in Example 1 was polymerised in homogeneous phase under nitrogen for 47 hours at 130° C. The resultant cross-linked polymer was swollen but not dissolved by dioxan, ultimately the polymer disintegrating to form a gel. This is in complete contrast to the ternary copolymer prepared according to Examples 1, 2 and 3 which were readily soluble in dioxan.

*Example 5*

The direct production of cross-linked polymers by single phase polymerisation is illustrated by the examples tabulated below in which a 10:1:1 molar styrene:acrylic acid:acrylonitrile mixture was used and in which the time and temperature of the polymerisation were varied as shown. The degree of cross-linking is evidenced by solubility or swelling in dioxan (10% w./v.) according to the following scheme.

Not cross-linked_____ Completely soluble no gelation.
Slightly cross-linked____ Highly swollen to form a soft mobile gel.
Cross-linked_____ Swollen to form stiff gel retaining shape of original specimen.

| Sample | Heating Cycle | | Appearance of polymer | Degree of cross-linking |
|---|---|---|---|---|
| | Time (Hrs.) | Temp. (°C.) | | |
| 1 | 90 at____ followed by 75 at__ | 80 130 | Milky white and hard. | cross-linked. |
| 2 | 9 at____ followed by 4 at___ | 80 160 | ____do____ | Do. |
| 3 | 2____ | 160 | Almost clear, very pale yellow, brittle. | Not cross-linked. |
| 4 | 18____ | 160 | Opalescent, faintly yellow, brittle. | Slightly cross-linked. |
| 5 | 18____ | 160 | Pale yellow, almost clear, rather soft. | cross-linked. |

In sample 5 above 0.1% w./w. p-toluene sulphonic acid was added to the monomers.

Example 6

The various ternary copolymers of styrene, acrylic acid and acrylonitrile shown in the following table, were prepared by sealing the monomer mixtures in glass tubes under nitrogen and heating the mixtures for a given time in an oil bath thermostatically controlled at the required temperature. Benzoyl peroxide was added as polymerisation catalyst in certain of the examples and the relative proportions of the monomers employed was expressed in molar parts by weight. The copolymers thus produced were then cross-linked by subjecting them to a pressure of 4000 lbs. per square inch for 15 minutes at a temperature of 180° C. in a 2" circular positive mould. The solubility characteristics of the various copolymers before and after the cross-linking reaction were compared in solvents such as acetone, dioxan, ethyl acetate, dimethylformamide and tetrahydrofuran and the results are shown in the following table where:

S_____. indicates that the copolymer was soluble.
G_____. indicates that the copolymer was highly swollen to form a soft, mobile gel.
I_____. indicates that the copolymer was swollen to form a stiff gel retaining the shape of the original specimen.

It will be seen from the table below that the solubilities of the various copolymers shown are reduced by the positive moulding process thus indicating that cross-linking has occurred.

Example 7

The copolymer d of Example 6 was dry-spun into fibres from a 20% solution in dioxan. After stretching, the fibres were passed slowly through a zone heated to 130° C. in an atmosphere of nitrogen. The heat-treated fibres showed increased tensile strength and were insoluble in dioxan and in dimethylformamide although the untreated fibres were soluble in both these solvents.

Example 8

A ternary copolymer was prepared by adding a monomer mixture of 52 parts of styrene, 36 parts of acrylic acid, 26.5 parts of acrylonitrile and 0.15 part of isopropyl hydroperoxide slowly over a period of 1¼ hours to 500 parts of a 2% w./v. aqueous sodium lauryl sulphate solution containing a further 0.15 part of isopropylbenzene hydroperoxide and preheated to 80° C. The whole operation was carried out under reflux with vigorous stirring in an atmosphere of nitrogen, and the temperature was maintained at 80°±2° C. throughout the addition of the monomers.

Immediately the addition was completed, unchanged monomers were removed by steam stripping and the resulting latex precipitated with alcohol to yield 65 parts of copolymer.

The copolymer was soluble in acetone, dimethyl-formamide, dioxan, ethyl acetate and tetrahydrofuran. After positive moulding under the conditions described in Example 1, it formed stringy gelatinous dispersions in these solvents.

Example 9

A mixture of styrene, acrylic acid and acrylonitrile in molar proportions of 2:1:1 and containing 0.05% w./w. of benzoyl peroxide was diluted with 3 times its own volume of acetone and sealed in a glass tube in an atmosphere of nitrogen and polymerized for 336 hours at 60° C. The resulting viscous solution was poured into water and the copolymer was precipitated and freed from residual monomers by steam stripping.

The dry polymer after positive moulding in the manner described in Example 1 was swollen by, but no longer soluble in, acetone. Other solvents such as dioxan may be used by suitably varying the conditions of polymerisation.

If the acetone is replaced by cyclohexane, with which the monomers are all miscible, the polymer is precipitated as polymerisation proceeds and may be separated by filtration. The resulting polymer may be cross-linked in the same manner.

Example 10

A copolymer of acrylic acid and acrylonitrile was prepared by the emulsion polymerisation of a mixture of 0.8 part of potassium persulphate, 0.3 part of sodium metabisulphite, 20 parts of acrylonitrile and 2.7 parts of acrylic acid in 400 parts of distilled water under an atmosphere of nitrogen at 36° C. for 2⅓ hours. After standing overnight the unreacted monomers were removed by steam stripping and the polymer slurry filtered and washed to give 18.2 parts of a very pale yellow powder. The polymer had a nitrogen content of 22.6% which corresponds to 85.6% acrylonitrile units.

The copolymer was readily soluble in dimethyl-formamide and in a 1:1 dimethylformamide-acetone mixture.

Fibres were prepared by wet spinning a 10% solution of the polymer in 1:1 acetone-dimethylformamide into an aqueous coagulating bath. The fibres after heating for a short time at 160° C. in an atmosphere of nitrogen were no longer soluble in dimethylformamide.

Example 11

Terpolymers were prepared using a number of alternative monomer systems, as below; in each case a molar ratio of 1 mol. alpha-beta-unsaturated acid: 1 mol. alpha-beta unsaturated nitriles: 2 mols. third monomer was employed.

Polymerisations were carried out at 80° C. with the addition of 0.05% w./w. on total monomers of benzoyl peroxide. The time of polymerisation was varied according to the monomer system used.

| Sample | Monomer Mixture | | | Heating cycle | | Catalyst, percent by weight | Appearance of Polymer | Solubility Characteristics | |
|---|---|---|---|---|---|---|---|---|---|
| | Styrene, Mols. | Acrylic Acid, Mols. | Acrylonitrile, Mols. | Time, Hours | Temp., °C. | | | Before Positive Moulding | After Positive Moulding |
| a | 2 | 1 | 1 | 118 | 100 | | Pale yellow transparent. | I | Less swollen. |
| b | 3 | 1 | 1 | 118 | 100 | | do | G | I. |
| c | 2 | 1 | 1 | 167 | 80 | | do | G | I. |
| d | 3 | 1 | 1 | 167 | 80 | | do | S | I. |
| e | 1 | 1 | 1 | 115 | 60 | 0.1 | Pale yellow bubbled. | G | I. |
| f | 2 | 1 | 1 | 115 | 60 | 0.1 | do | S | I. |
| g | 2 | 1 | 1 | 240 | 60 | | Pale yellow transparent. | G | I. |
| h | 2 | 1 | 1 | 24.5 | 60 | 0.05 | do | S | I. |
| i | 2 | 1 | 1 | 242 | 60 | 0.05 | do | G | I. |
| j | 1 | 1 | 1 | 24 | 60 | 0.05 | Opalescent yellow. | G | I. |

| | Alpha-beta Unsaturated Acid | Alpha-beta Unsaturated Nitrile | Third Monomer |
|---|---|---|---|
| a | Maleic acid | Acrylonitrile | Styrene. |
| b | Acrylic acid | Crotononitrile | Do. |
| c | do | Cinnamonitrile | Do. |
| d | do | methacrylonitrile | Do. |
| e | do | Acrylonitrile | -methylstyrene. |
| f | do | do | Vinyl acetate. |
| g | do | do | Allyl acetate. |
| h | do | do | Methyl methacrylate. |
| i | do | do | Vinyl ethyl ether. |
| j | do | do | Vinyl chloride. |
| k | do | do | Ethyl citraconate. |
| l | do | do | Ethyl chloromaleate. |
| m | do | do | Vinyl crotonate. |
| n | do | do | Ethyl acrylate. |

The various terpolymers produced above were cross-linked by pressing samples between platerns heated at 180° C. for 10 minutes under a pressure of 1000 lbs. per square inch. The polymers a, b, c, d, e, h, i, k and l were initially all soluble in acetone but became insoluble after the cross-linking reaction. Copolymers f, g, j, m, and n were initially all highly swollen by acetone but after cross-linking they were substantially unaffected by the solvent.

*Example 12*

Samples of ethyl acrylate, acrylonitrile, acrylic acid terpolymers were prepared by copolymerisation in single phase 35% solutions in acetone and used as thermosetting adhesives for duralumin.

Close-contact joints having an overlap of 1" x ½" were prepared from 4½" x 1" pieces of duralumin ⅛" thick, by spreading the acetone solution, allowing the solvent to evaporate and pressing according to the following schedule.

Open assembly time _____ 10 mins. 20° C.
Pressing temperature _____ 180° C.
Pressing time _____ 15 mins.
Pressing pressure _____ 130 lbs./sq. in.

Mean shear strength figures (after cooling) shown in the following table are similar to the strengths obtained with commercial phenolic adhesives for aluminum alloys.

| Acrylic acid (Molar parts) | Acrylonitrile (Molar parts) | Ethyl Acrylate (Molar parts) | Mean shear strength in lbs. per 1" x ½" lap |
|---|---|---|---|
| 1 | 1 | 2 | 1,430 |
| 2 | 1 | 2 | 1,190 |

*Example 13*

Copolymers were prepared by refluxing the following mixtures until polymerisation was complete, in an atmosphere of nitrogen (quantity in parts by weight).

| Copolymer No. | a | b | c |
|---|---|---|---|
| Acrylic acid | 72 | 72 | 144 |
| Acrylonitrile | 53 | 53 | 53 |
| Ethyl acrylate | 200 | 400 | 200 |
| Benzoyl peroxide | 1.0 | 1.6 | 1.3 |
| Acetone | 1,300 | 2,100 | 1,580 |

The three solutions, each containing ca. 20% by weight of solid resin, were tested as stoving lacquers. Panels of aluminum, tinplate and glass were coated with films of the lacquers by dipping, the acetone was allowed to evaporate for 15 minutes at room temperature and the panels were stoved for 15 minutes at 180° C. Clear tough, scratch resistant, flexible films showing exceptional adhesion to the metal or glass surfaces and insoluble in acetone were formed. The metal panels could be bent over a ¼" mandrel without the stoved films showing signs of cracking.

Although the process of the present invention has been described with particular reference to those polymers containing free carboxyl and nitrile groups derived from the copolymerisation of alpha-beta unsaturated carboxylic acids and nitriles as hereinbefore defined, it is within the scope of the present invention to apply the process of the present invention to other polymers containing free carboxyl and nitrile groups whereby improved polymerised compositions may be formed due to the formation of di-acylamino groups. For instance, polymers containing free carboxyl and nitrile groups may be obtained by the polymerisation of a monomer containing both free carboxyl and nitrile groups. Polymers containing free carboxyl and nitrile groups may also be produced as a result of polycondensation reactions such as, for instance, the condensation of a polyhydric alcohol containing free nitrile groups with excess of a polybasic acid. It is further possible to produce polymers containing free carboxyl and nitrile groups by copolymerising a monomer containing a nitrile group with one containing a potential carboxylic acid group which may be released after polymerisation. For instance, polyacrylonitrile may be partially hydrolysed to form a polymer containing both free carboxyl and nitrile groups.

We claim:

1. A process for the production of a cross-linked polymerized composition which comprises interpolymerizing an alpha-beta ethylenically unsaturated carboxylic acid with an alpha-beta ethylenically unsaturated nitrile in the presence of a third copolymerizable compound to produce a ternary interpolymer containing at least 10 moles per cent of alpha-beta unsaturated carboxylic acid and alpha-beta unsaturated nitrile units, the ratio of the number of free carboxyl groups to free nitrile groups being 1:1, and thereafter maintaining the interpolymer at a temperature of 100–200° C. until cross-linking by the formation of diacylamino groupings has occurred.

2. A process as claimed in claim 1 wherein the ternary interpolymer contains at least 60 moles per cent of units obtained from the polymerization of the third copolymerizable compound.

3. A process as set forth in claim 1, wherein the interpolymerisation is carried out in the substantial absence of molecular oxygen.

4. A process as set forth in claim 1, wherein the cross-linking reaction is brought about with the aid of an acidic catalyst.

5. A process as set forth in claim 4, wherein the acidic catalyst employed is an organic acid which is a plasticiser for the polymer containing the free carboxyl and nitrile groups.

6. A process as set forth in claim 1, wherein the cross-linking reaction is brought about during a molding operation at a temperature in the range 150 to 200° C. and for a reaction period of between 5 and 30 minutes.

7. A process as set forth in claim 1, wherein the cross-linking reaction is brought about by passing a fibre of the polymer containing the free carboxyl and nitrile groups through a heated zone.

8. A process as set forth in claim 1, wherein the cross-linking reaction is brought about in a thin film of the polymer containing free carboxyl and nitrile groups on a surface to be lacquered or glued.

9. A cross-linked polymerised composition containing diacylamino groupings derived from a polymer containing free carboxyl and nitrile groups according to the process of claim 1.

10. A cross-linked polymerised composition containing diacylamino groupings derived from a ternary interpolymer of styrene, acrylic acid and acrylonitrile according to the process of claim 1.

11. A cross-linked polymerised composition containing diacylamino groupings derived from a ternary interpolymer of ethyl acrylate, acrylic acid and acrylonitrile according to the process of claim 1.

12. A process as set forth in claim 1 wherein the cross-linking reaction is brought about with cetostearyl hydrogen phthalate as acidic catalyst.

References Cited in the file of this patent
UNITED STATES PATENTS

| | | |
|---|---|---|
| 2,436,926 | Jacobson | Mar. 2, 1948 |
| 2,445,042 | Silverman | July 13, 1948 |
| 2,456,360 | Arnold | Dec. 14, 1948 |
| 2,592,248 | Coover et al. | Apr. 8, 1952 |